May 8, 1928.

W. R. BARNEY 1,668,754

ROD CLAMP

Filed April 25, 1927

William R. Barney
INVENTOR.

BY
ATTORNEY.

Patented May 8, 1928.

1,668,754

UNITED STATES PATENT OFFICE.

WILLIAM R. BARNEY, OF TULSA, OKLAHOMA, ASSIGNOR TO WILBUR C. NORRIS, OF TULSA, OKLAHOMA.

ROD CLAMP.

Application filed April 25, 1927. Serial No. 186,325.

Rod clamps have usually been provided with U bolts which have been secured between the clamp plates, the U bolts being provided with heads which prevented their withdrawal from the plates. The attached rod has also been usually secured between these plates and arranged midway between the sides of the U bolt. This construction has often led to injury to the operators by reason of the U bolts closing up in the opposite direction from that of the usual strain. The present invention is designed to obviate this difficulty as to such clamps and also to provide a clamp more convenient for use. Features and details of the invention will appear from the specification and claims.

A preferred embodiment of the invention is illustrated in the accompanying drawings as follows:—

Figure 3:
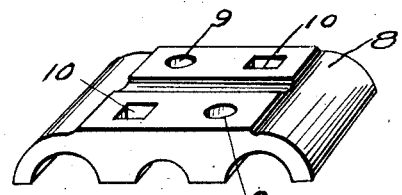

Fig. 3 a detached perspective view of the loose plate.

Figure 1:
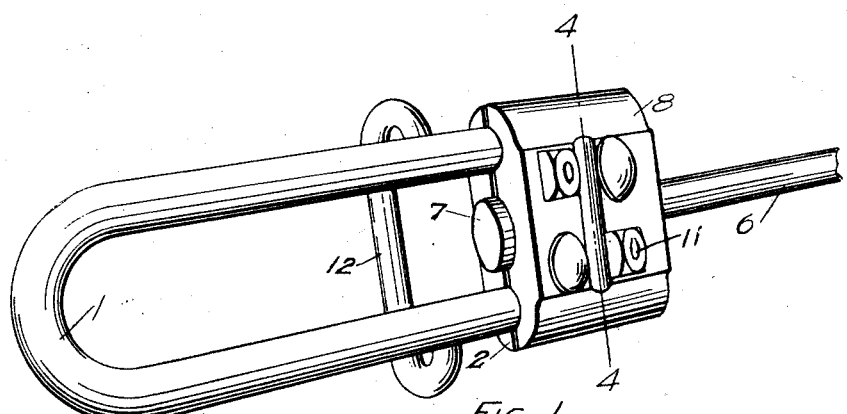
Fig. 1 shows a perspective view of the rod clamp.
Figure 2:
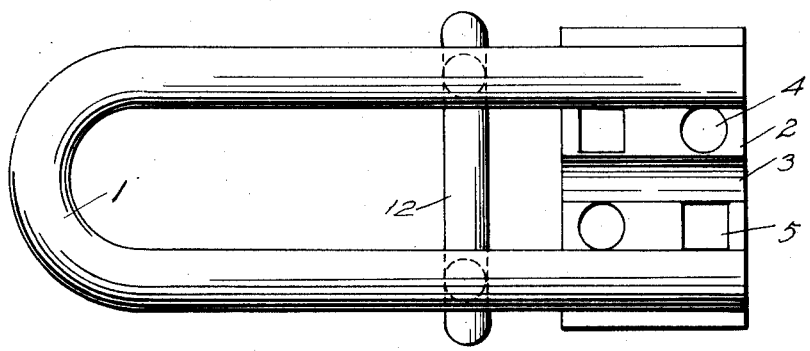
Fig. 2 is a side elevation of the U loop and its connected plate, the loose plate being removed.
Figure 4:
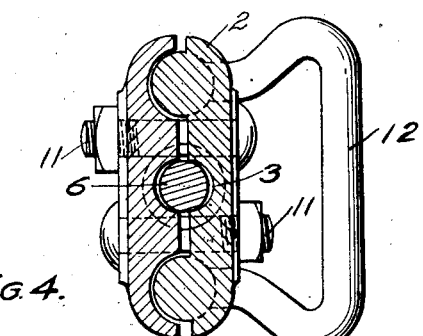

Fig. 4 a section on the line 4—4 in Fig. 1.

1 marks the loop which corresponds in shape to the usual U bolt. This is preferably cast with one of the clamping plates 2. The plate has the usual groove 3 for receiving the pull rod and the round and square openings 4 and 5 respectively for receiving the clamping bolts. A pull rod 6 is of the usual form provided with a head 7, the rod being arranged, as before stated, in the groove 3. A loose plate 8 corresponds generally in shape with the plate 2 and has the round and square openings 9 and 10 respectively, the round openings registering with the square openings 5 of the main plate 2 and the square openings 10 registering with the round openings 4 of the main plate. The usual shaped carriage bolts 11 are passed through the openings for clamping the plates together, thus securing the rod 6 in place.

I prefer to provide a transverse loop 12 between the sides of the loop 1, this loop forming a handle, or hanger attachment for the clamp.

What I claim as new is:—

1. In a rod clamp, the combination of a clamping plate; a longitudinal loop connected with the plate and locked against movement relatively to the plate in all directions; a secondary clamping plate, said plates having means receiving a rod; means securing the plates in clamping relation; and a transverse loop joining the sides of the longitudinal loop.

2. In a rod clamp, the combination of a clamping plate; a loop having the sides thereof extending entirely across said plate and permanently secured to said plate; a secondary clamping plate, said plates having means extending between and parallel with the sides of the loop and entirely across the plate for receiving a rod opposing the loop; and means securing the plates in clamping relation clamping the rod between them, comprising bolts extending through the plates and between the sides of the loop and the rod.

In testimony whereof I have hereunto set my hand.

WILLIAM R. BARNEY.